United States Patent [19]

Gregg

[11] 4,065,168
[45] Dec. 27, 1977

[54] TRAILER VAN CONSTRUCTION

[75] Inventor: Richard G. Gregg, Kewanee, Ill.

[73] Assignee: Pines Trailer Corporation, Chicago, Ill.

[21] Appl. No.: 261,610

[22] Filed: June 12, 1972

[51] Int. Cl.$^2$ ............................................. B62D 33/04
[52] U.S. Cl. .................................. 296/28 M; 52/483; 296/29
[58] Field of Search ........................ 296/28 M, 29, 36; 280/106 T; 105/409; 52/90, 94, 282, 480, 481, 483, 495

[56] References Cited

U.S. PATENT DOCUMENTS

| | | | |
|---|---|---|---|
| 1,922,027 | 8/1933 | Carter | 296/28 M |
| 2,046,246 | 6/1936 | Clem | 52/495 X |
| 2,872,240 | 2/1959 | Bennett | 296/28 M |
| 3,353,863 | 11/1967 | Koot | 296/28 M |
| 3,393,920 | 7/1968 | Ehrlich | 280/106 T |
| 3,692,349 | 9/1972 | Ehrlich | 296/28 M |

FOREIGN PATENT DOCUMENTS 1,071,936  6/1967  United Kingdom ............. 296/28 M

*Primary Examiner*—L. J. Paperner
*Attorney, Agent, or Firm*—Silverman & Cass, Ltd.

[57] ABSTRACT

A trailer van construction with side walls which provide the trailer van with greater storage space. The trailer van includes a floor, upstanding end walls, a roof and opposite side walls. Each side wall includes a generally rectangular, elongate panel having generally parallel upper and lower edges, and a top framing structure. The framing structure includes a top rail having a depending plate portion and at least one laterally extending flange for supporting the roof. The end walls have different heights and the plate portion has a vertical dimension greater than the difference in height between the end walls. A capping member is assembled over the upper edge of the panel and secured to the outer surface of the plate portion along a line which is nonparallel to the top edge of the top rail such that the upper margin of each side wall is defined by a wedge-shaped section of the plate portion.

6 Claims, 5 Drawing Figures

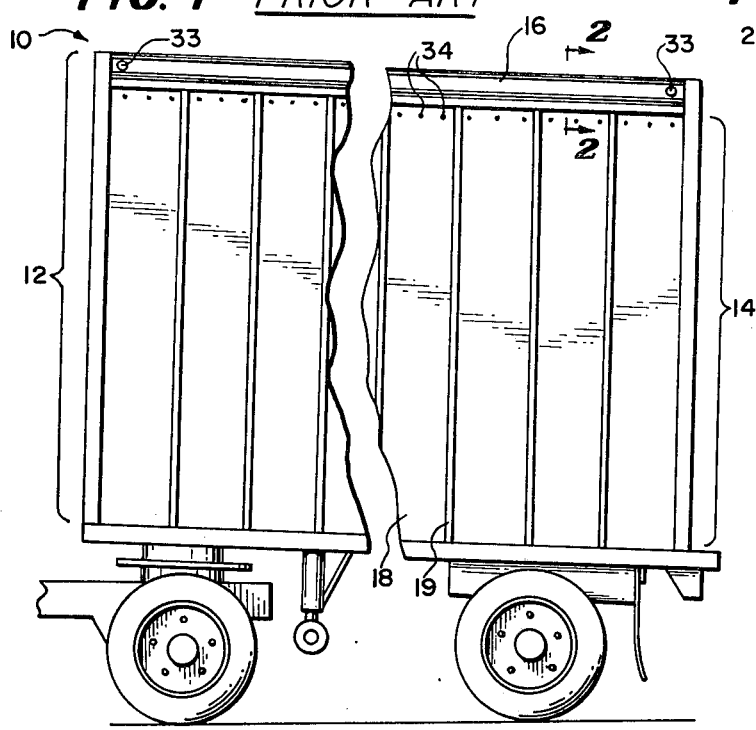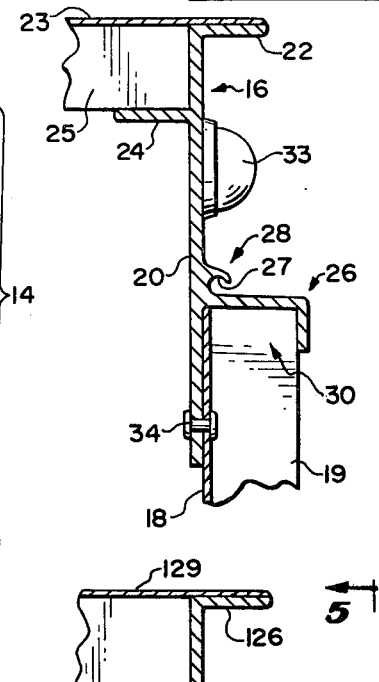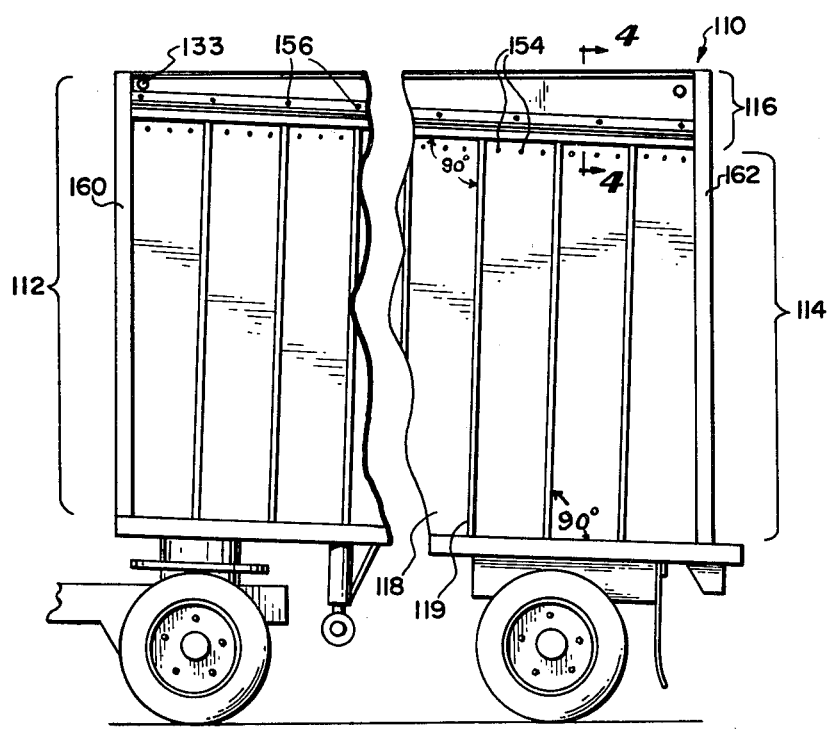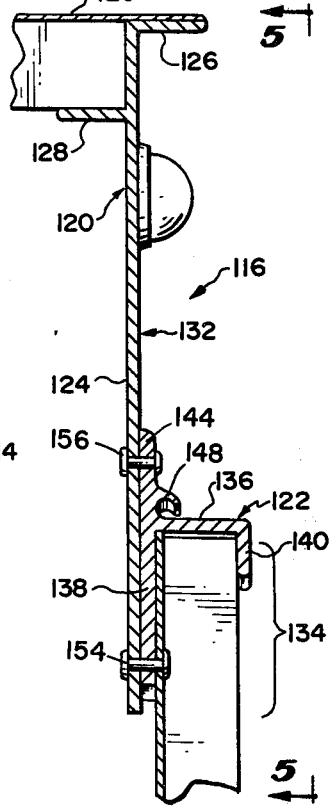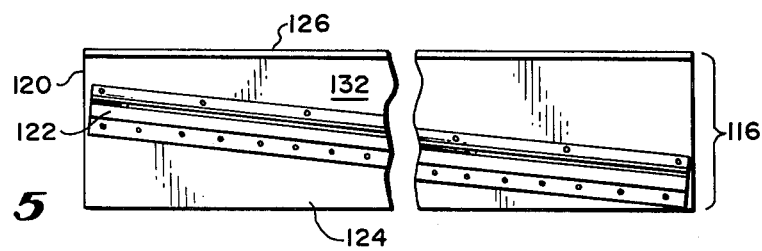

TRAILER VAN CONSTRUCTION

BACKGROUND OF THE INVENTION

The present invention relates to a trailer van construction and particularly to the construction of side walls for a trailer van.

The maximum vertical height of a trailer van is limited by governmental standards, e.g., standard bridge clearances. The height of a floor of a trailer van above ground is limited by the size and mounting requirements of the front and rear wheel trucks or carriages. The front wheel carriage for the trailer van is usually incorporated into the cab portion of a truck-trailer and the front end of the trailer van is supported thereon. The rear end of the trailer van is supported on a wheel carriage fixed to and beneath the floor of the trailer van. In the construction of cabs and trailer vans there has developed a difference in the above ground height between the front end of the trailer van and the rear end of the trailer van. As a result, the point of maximum height of the trailer van is at the front end of the trailer van and the floor and roof of the trailer van slope downwardly to the rear end of the trailer van. Typically, the vertical extent or height of the rear end of the trailer van is 7 inches below the top of the front end of the trailer van.

In loading trailer vans, dock workers attempt to fill all available space in the trailer van for maximum efficiency and maximum pay load. Accordingly, if additional space can be formed in the trailer for storing additional goods, a greater efficiency and space utilization can be obtained. For this reason various attempts have been made to utilize the wedge of space at the top of the trailer van defined between a plane parallel to the ground and the plane of the roof, both planes intersecting at the top front edge of the trailer van. Typically, these attempts have involved the building of a trailer van with a roof which is parallel to ground level. The floor is non-parallel with the roof and slopes downwardly from the front end of the trailer van to the rear end of the trailer van. The side walls of the trailer van then must have an irregular shape with a vertical extent at the rear of the trailer van which is greater, typically seven inches greater, than the vertical extent at the front end of the trailer van.

An example of a truck-trailer having a trailer van with a front end which is higher than the rear end of the trailer van and with irregular side walls is disclosed in U.S. Pat. No. 2,872,240 (Class 296-28). In the trailer van disclosed in this patent, each side is formed from a longitudinally extending sheet. This, of course, requires special cutting of each sheet in order to form each side wall with the desired irregular shape.

In many conventional trailer vans, the side walls are formed from a plurality of rectangular sheets which are arranged side by side, like a fence. An example of a trailer construction of this type is disclosed in U.S. Pat. No. 3,393,920 (Class 280-106). In this type of construction the sheets are secured together by posts to form an elongate panel. The bottom edge of the panel is secured to a bottom or floor frame member and the marginal edge portion of the panel is secured to an elongate top rail or frame member. Typically the elongate top frame member includes a depending plate portion to which the panel is secured, laterally extending flanges adjacent the top edge of the frame member for supporting the roof, and a capping flange which extends outwardly from the plate portion for extending over the top edge of the sheets and posts. This latter flange forms a cover for the top edges of the panel formed from the sheets and posts. Additionally, a cable-covering flange extends outwardly over the capping flange and is adapted to receive thereunder a cable for supplying electricity to electric lamps mounted on the top frame member along the length thereof.

To form the side walls of this type of trailer van with an irregular shape, so that the roof is parallel to ground level, each sheet for one side wall panel is cut with a different length and preferably cut at an angle. Then, the sheets must be aligned in proper relationship with the shortest sheet at one end and the longest sheet at the other end of the panel formed from the sheets. Since cutting of the sheets at an angle is awkward and time consuming, it is more likely that the sheets will be cut in different lengths, with the cut being perpendicular to the side edges of each sheet. Then the sheets are assembled to form the elongate panel with a stepped top edge and the posts are secured to overlapping side edges of the sheets. Of course, this means that the capping flange will only engage the extending upper corners of the sheets or the posts. Also, there is still the problem of cutting the sheets in different lengths and then aligning the sheets in proper relationship to each other. This results in a significant increase in the cost of making and assembling a side wall with an irregular shape over the cost of making and assembling a rectangular side wall.

It is, therefore, a primary object of the present invention to provide in a trailer van construction a side wall in which no special cutting or special arrangement of each sheet for one side wall is required to provide each side wall with the desired irregular shape.

SUMMARY OF THE INVENTION

According to the invention, there is provided an elongate framing structure for use in the construction of a side wall for a trailer van, the framing structure including a rail having a depending plate portion and laterally extending means for supporting a roof of the trailer van. The rail is of uniform cross section along its length and the plate portion has a substantially unobstructed flat surface to which the upper edge of a panel can be secured at an angle to the top edge of the rail.

Preferably, the framing structure also includes an elongate capping member having a covering portion which is adapted to extend over and cover the upper edge of a panel of the van side wall and at least one flange for attaching the capping member to the plate portion. The capping member is also of uniform cross section along its length.

Also, according to the invention there is provided in a trailer van construction of the type having a generally boxlike body including side walls, a roof and a floor, the floor, during normal use of the trailer van, being tilted with the front end thereof higher than the rear end thereof such that the floor slopes downwardly from front to rear, an improved side wall including an elongate framing structure and an elongate generally rectangular panel. The framing structure includes a rail having a depending plate portion and laterally extending means for supporting the roof. The rail is of uniform cross section along its length. The plate portion has a substantially unobstructed flat surface, and the panel has a lower edge secured to the floor and an upper edge which is parallel to the lower edge and which is secured to the plate portion at an angle with respect to the roof, whereby the distance between the floor and the roof is greater at the rear of the trailer van than at the front of the trailer van.

Further, according to the invention, there is provided a method for constructing a side wall for a trailer van. The method includes the steps of: placing the upper margin of a generally rectangular panel on a plate portion of a top rail for the side wall, the panel having generally parallel upper and lower edges; aligning the upper edge of the panel at an angle to the top edge of the rail such that one upper corner of the panel is further from the rail top edge than the other upper corner; holding the rail and the panel as aligned; and securing the upper margin of the panel to the plate portion, thereby to form a side wall defined by the panel and the plate portion and having a height at one end which is greater than the height at the other end.

BRIEF DESCRIPTION OF THE DRAWINGS

FIG. 1 is a side elevational view with portions broken away of a conventional prior art trailer van;

FIG. 2 is a fragmentary vertical sectional view taken generally along the line 2—2 of FIG. 1 and in the indicated direction showing the cross section of a conventional prior art top frame member of the van side wall;

FIG. 3 is a side elevational view with portions broken away of a trailer van with a side wall constructed according to the teachings of the present invention;

FIG. 4 is a fragmentary vertical sectional view taken generally along the line 4—4 of FIG. 3 and in the indicated direction showing the cross section of the top frame member and of the capping member utilized in constructing the side wall of the trailer van of invention; and FIG. 5 is a fragmentary side elevational view with portions broken away of the upper portion of the side wall of the trailer van of the invention taken generally along the line 5—5 of FIG. 4 and in the direction indicated.

DESCRIPTION OF A PRIOR ART TRAILER VAN

A conventional prior art trailer van is generally identified by the reference numeral 10 in FIG. 1. The trailer van 10 includes a conventional side wall 12 comprised of a panel 14 and a top frame member or top rail 16. The panel 14 is formed from a plurality of rectangular sheets 18 which are arranged side by side. Typically, the side edges of the sheets overlap and the overlapping edges are held in place by posts 19. In this prior art trailer van 10, the above floor height of the front and rear edge of the side wall 12 are the same although the floor and roof slope from front to rear.

The top rail 16 is typically an elongated aluminum extrusion having a particular configuration as best shown in FIG. 2. In this respect, the top rail 16 includes a depending plate portion 20 which in a typical prior art side wall construction has a vertical extent or dimension of approximately 7 inches. The top edge of the rail 16 is defined by a flange 22 which extends laterally outwardly from the side wall of the trailer van and which forms a support and attachment surface for a sheet of metal 23 forming part of the roof of the vehicle. The upper portion of the rail 16 includes another flange 24 which is spaced below the flange 22 and which extends laterally inwardly of the side wall 12 of the trailer van 10. This flange 24 provides a support and connecting surface for transversely extending cross members or beams 25 of the roof.

At a point spaced below the flange 24 are further flange formations extending from the top frame member 16 laterally outwardly of the side wall 12 of the van 10. These flange formations are identified by the reference numerals 26 and 28. The flange formation 26 is generally L-shaped so as to form with the plate portion 20 an inverted U-shaped trough or channel generally indicated by the reference numeral 30 for receiving and covering the upper edge of the posts 19.

The flange formation 28 is generally in the shape of a quarter moon and extends over and adjacent to the flange formation 26 so as to form an elongated channel 27 of generally circular cross section within which a cable may be mounted and protected. The flange formation 28 forms a conduit for the electrical conductor or cable which supplies electric power to electric lamp assemblies mounted at various locations along the upper edge of the side wall 12. Two such lamp assemblies are shown at 33 in FIG. 1.

As best shown in FIG. 2, the upper margin of the panel 14 is secured to the plate portion 20 by means of rivets 34.

DESCRIPTION OF THE PREFERRED EMBODIMENTS

Referring now to FIG. 3, a trailer van constructed in accordance with the teachings of the present invention is identified by the reference numeral 110. The trailer van 110 includes a side wall 112 which has an irregular shape as opposed to the rectangular shape of the side wall 12 shown in FIG. 1. The side wall 112 includes an elongated panel 114 having the shape of a parallelogram and a top framing structure or frame assembly 116. The elongate panel 114 is formed from a plurality of sheets 118 which are arranged side by side with their side edges overlapping, the overlapping side edges being secured in place by posts 119.

As shown in FIG. 4, the framing structure 116 includes an elongate top frame member or top rail 120 and an elongate capping member 122. The top rail 120 includes a depending plate portion 124 and roof supporting flanges 126 and 128. As shown, the flange 126 is similar to the flange 22 shown in FIG. 2 and supports a metal sheet or skin 129 forming part of the roof assembly for the trailer van 110. Likewise, the inwardly extending flange 128 is similar to the flange 24 shown in FIG. 2, and supports structural members or beams 131 of the roof assembly. The plate portion 124 has an outwardly facing flat surface 132 which, except for several light assemblies 133 adjacent the underside of flange 126, is unobstructed for the full vertical extent of the plate portion 124 beneath the flange 126. This outer surface 132 provides an attachment surface for attaching the marginal area or upper margin 134 adjacent the upper edge of the panel 114 to the top rail 120.

The elongate capping member 122 has an inverted generally U-shaped cross section as shown in FIG. 2. This U-shape is defined by a bight portion 136 and two leg portions 138 and 140. The leg portion 138 is longer than the leg portion 140 and forms or defines an attachment flange for attaching the capping member 122 to the plate portion 124 of the top rail 120. The bight portion 136 and the other leg 140 form an L-shaped flange formation defining a covering or capping portion of the capping member 122 with an inverted U-shaped trough or channel 142, similar to the trough 30 shown in FIG.

2, being defined beneath the bight portion 126 and between the legs 138 and 140. The upper edge of the panel 114 is received in the trough 142. The capping member 122 also has a flange 144 which extends upwardly from the bight portion 136 and which is coplanar with the flange 138. The flanges 138 and 144 both form attaching or mounting flanges for attaching the capping member 122 to the plate portion 124 of the top frame member 120. Also, the flange 144 provides structure from which a cable covering flange 148, similar to the cable covering flange 28 shown in FIG. 2, can extend. In this respect, the flange 148 extends over the bight portion 136 and is adapted to receive, hold and protect a wire conductor — a cable which supplies electrical power to the lamp assemblies 133.

After the upper edge of the elongated panel 114 is received in the trough 142 of the capping member 122, the upper margin 134 of the panel 114 is secured by means of a plurality of rivets 154 to the plate portion 124. The rivets 154 serve as a fastening both the marginal area 134 and the flange 138 of the capping member 122 to the plate portion 124 of the top frame member 120. The flange 144 is also secured to the plate portion 124 by means of rivets 156 which are spaced further apart than the rivets 154.

It will be apparent from FIG. 3 that the capping member 122 is riveted to the plate portion on an angle. Stated otherwise, the top edge of the capping member 122 is aligned nonparallel to the top edge of the top rail 116, i.e., it slopes downwardly toward the rear of the trailer van such that the side wall 112 is defined in part by a wedge-shaped section of the plate portion 124.

As stated above, in many conventional trailer vans the height of the front end of the floor of the van above ground is typically 7 inches greater than the height of the rear end of the floor of the van above ground. As a result, it has been found that the vertical extent or dimension of the plate portion 124 should be at least 11 inches. Of course, the vertical dimension of the plate portion 124 can be greater to obtain a larger wedge of additional space at the top of the trailer van. This will depend upon the vertical height requirements of the front and rear trucks or wheel carriages of the trailer van.

In constructing a side wall 112, the sheets 118 and posts 119 are assembled on a horizontal table to form the panel 114 with generally parallel upper and lower edges. Then the capping member 122 is assembled on, but not secured to, the upper edge of the panel 114. Next the capping member 122 and panel upper edge are aligned on the plate portion 124 of the top rail 120 with the top edge of the capping member nonparallel to the top edge of the top rail 120. The parts of the assembly are then aligned, i.e., the elongate panel 114, the capping member 122 and the top rail 116, are fixed in place, such as with clamps, and riveted together with rivets 154 and 156. The alignment between the top rail 120 and the capping member 122 is best shown in FIG. 5. Subsequently, one or both end sheets of the panel 114 may be cut to form the panel 114 with one or both end edges perpendicular to the roof. This will depend upon the side wall configuration desired and upon the width of end or corner posts 160 and 162. If they are sufficiently wide, the end edges of the panel can be placed behind the posts and adequately secured thereto even though the end edge may be at an angle with respect to the longitudinal axis of the post 160, 162.

In the illustrated embodiment, the front and rear end walls are shown perpendicular to the roof and the corner posts 160, 162 are not too wide. Accordingly, in this embodiment, the end edges of the panel 114 are cut to form the same perpendicular to the roof and to ground level. As a result, the panel 114 has the shape of a parallelogram and the side wall 112 is defined by the parallelogram-shaped panel 114 and a wedge-shaped section of the plate portion 124.

It is to be understood that both end walls may not be perpendicular to the roof and ground level. In fact, it is contemplated that in many embodiments of the trailer van of the invention only the rear end wall will be perpendicular to the roof and to ground level and the front end wall will be perpendicular to the floor, i.e. at an angle to the vertical similar to the angle of the front end wall of the trailer van shown in FIG. 1. Thus, in the construction of many trailer vans of the invention only the rear edge of each side wall will be cut to form the same perpendicular to the roof and to ground level.

It is to be understood that the capping member 122 can be arranged at any desired position with respect to the plate portion 124 and have any one of a number of slopes relative to the top edge of the top rail 120. The maximum slope, of course, will depend upon the length of the top frame member 120 and the vertical dimension of the plate portion 124. In any event, the side wall construction of the present invention allows for great flexibility in the shaping of the side walls for a trailer van at a small increase in cost over conventional, e.g., rectangular side walls.

The side wall 112 is now ready for use in the construction of the trailer van 110. In this respect, the end edges of the panel 114 are secured to the end or corner posts 160 and 162, the bottom margin of the panel 114 is secured to a bottom frame member (hidden from view) and the ends of the top frame assembly 116 are secured to the upper ends of the posts 160 and 162.

Although the preferred embodiment of the side wall construction of the present invention includes a capping member 122, it is to be understood that the teachings of the invention can be practiced without the capping member 122. In this respect, one could merely rivet or otherwise fasten the upper margin 134 of the panel 114 to the outer surface 132 of the plate portion 124. This construction would have the advantage of the cost saving of the capping member 122. However, it would have the disadvantage of permitting entry of moisture and other foreign matter into the posts 119 or into panel units made with a double wall (sheet) construction. The moisture, of course, could cause a corrosion problem and shorten the useful life of the side wall. Additionally, such a modified construction would not provide a cable-covering flange for a cable to supply electric power to the lamp assemblies 133 mounted adjacent the top edge of the side wall as provided by the cable covering flange 148. Consequently, a side wall construction including the capping member 122 is preferred.

It will be understood that modifications and variations can be made to the embodiments of the invention without departing from the spirit or scope of the invention. In this respect, obvious modifications to the particular configuration of the roof-supporting flanges and/or to the particular configuration of the capping member will occur to those skilled in the art. Accordingly, the scope of the present invention is only to be limited as necessitated by the accompanying claims.

What it is desired to secure by Letters Patent of the United States is:

1. An elongate framing structure for use in the construction of a side wall of a trailer van, said framing structure comprising, an elongate rail having a top edge and a depending plate portion and laterally extending means for supporting a roof of the trailer van, said plate portion having a substantially unobstructed flat surface, an elongate capping member having a covering portion adapted to extend over and cover the upper edge of a panel part of said side wall, the capping member including flange means for attachment to said plate portion, and fastening means for securing the capping member with an upper margin of said panel part retained thereon to the flat surface of the plate such that the covering portion and the upper edge of the panel extends at an angle with respect to the top edge of the rail.

2. The framing structure as claimed in claim 1 in which said plate portion has a width of at least 11 inches.

3. A method for constructing a side wall for a trailer van, said method including the steps of: assembling an elongate capping member over the upper margin of a generally rectangular panel having generally parallel upper and lower edges, placing the assembled capping member and panel on a plate portion of a top rail for the side wall, aligning the upper edge of said assembled capping member and panel at an angle to the top edge of said rail such that one upper corner of said panel is further from said rail top edge than the other upper corner, holding said rail and said panel as aligned, and securing said assembled capping member and panel to said plate portion, thereby to form a side wall defined by said panel and said plate portion and having a height at one end which is greater than the height at the other end.

4. The method according to claim 3 wherein one corner of said panel is approximately 7 inches further from said top edge of said rail than the other corner of said panel.

5. The method according to claim 3 including the step of forming the panel from a plurality of rectangular sheets.

6. The method according to claim 3 including the step of cutting at least one end edge of the panel so that said at least one end edge is generally perpendicular to said rail top edge.

* * * * *